Patented Apr. 8, 1941

2,237,781

UNITED STATES PATENT OFFICE 2,237,781

PRODUCTION OF GUANIDINE SULPHAMATES

William H. Hill, Stamford, Conn., assignor to American Cyanamid Company, New York, N. Y., a corporation of Maine No Drawing. Application November 29, 1939, Serial No. 306,675

2 Claims. (Cl. 260—564)

This invention relates to a method for the preparation of guanidine sulphamates and is a continuation-in-part of my copending application Ser. No. 305,176, filed November 18, 1939.

In the preparation of guanidine salts it has been customary to react the selected acid with a guanidine salt or with the free base which has been released in known manner from a guanidine salt. The guanidine salt is usually prepared from guanidine nitrate as the intermediate since the nitrate is made in high yields by the easy fusion of ammonium nitrate and dicyandiamide. While the ammonium nitrate gives an easy fusion it also presents a definite explosion hazard in this process.

It is an advantage of the present invention that it provides a process for the preparation of guanidine salts useful as intermediates in the synthesis of other guanidine salts which avoids the aforementioned explosion hazard. It is a further advantage that high yields of product may be obtained. It is a still further advantage that ease of fusion of the components can be had.

The foregoing advantages may be accomplished in accordance with the invention by fusing one of the group consisting of ammonium sulphamate and the amine addition salts of sulphamic acid with dicyandiamide to form a melt containing a guanidine sulphamate product.

The process of the present invention is illustrated by the following specific example of the preparation of guanidine sulphamate in which two moles of ammonium sulphamate are fused with one mole of dicyandiamide to which however the invention is not to be limited.

Example

A mixture of 228 grams of ammonium sulphamate and 84 grams of dicyandiamide were heated by means of an oil bath having a temperature of 155° C. Ammonia in very small amounts was evolved from the start and at 115° C. a thin melt resulted which thickened appreciably at 125° C. At 150° C. a clear thin melt resulted and the temperature rose exothermically to 175° C. whereupon the reaction mix was removed from the oil bath and allowed to cool to around 150° C. Heating was then resumed. The mass was heated for a total of about three hours, ½ hour being taken to heat it up to about 150° C. For most of the heating time the temperature of the mass varied between 145–155° C. The product dissolved freely in water to give a solution showing a pH of 6.5 and analyzed about 90% guanidine sulphamate. On recrystallization from water the product gave large colorless crystals of over 95% purity.

The guanidine sulphamate product had a specific gravity of about 1.68 and on microscopical analysis showed the following physical properties: refractive indices, $N_1 > 1.5149 < 1.5217$; $N_2 > 1.6013 < 1.6123$. Biaxial (+), from optic axis interference figure. Optic axial angle probably large. Crystals (recrystallized from water) probably belong to the monoclinic or triclinic system.

While the process of the present invention has been described more particularly with reference to the preparation of guanidine sulphamate it is not intended that it be restricted thereto since the substituted guanidine salts of sulphamic acid may be prepared in like manner by fusing sulphamic acid addition salts of the amines of the aliphatic, carbocyclic, and heterocyclic series, such for example as methylamine sulphamate, aniline sulphamate, morpholine sulphamate and the like with dicyandiamide.

The amine addition salts of sulphamic acid may be prepared in accordance with the procedure of Butler and Audrieth, J. Amer. Chem. Soc. 61, 914 (1939), which was reported with reference to the preparation of alkyl substituted ammonium sulphamates and in which finely pulverized sulphamic acid is added slowly to an equivalent quantity of the amine, the final solution being made slightly basic by adding a few drops of the amine to avoid contamination of the product with the free acid. The preparation of aniline sulphamate is described by Paal and Kretschmer, Ber. 27, 1243 (1894), in which a slight excess of aniline is added to a water solution of sulphamic acid and the salt crystallized in large colorless flakes from the concentrated solution.

What I claim is:

1. A method for the production of a guanidine sulphamate which comprises fusing one of the group consisting of ammonium sulphamate and the amine addition salts of sulphamic acid with dicyandiamide to form a melt containing the product.

2. A method for the production of guanidine sulphamate which comprises fusing ammonium sulphamate with dicyandiamide to form a melt containing the product.

WILLIAM H. HILL.